United States Patent [19]

Ooki

[11] Patent Number: 5,991,846
[45] Date of Patent: *Nov. 23, 1999

[54] INFORMATION PROCESSING APPARATUS WITH OUTPUT DEVICE SELECTION BASED ON DEVICE CHARACTERISTICS AND PRIORITIES

[75] Inventor: Jouji Ooki, Yokohama, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/559,814

[22] Filed: Nov. 17, 1995

[30] Foreign Application Priority Data

Nov. 21, 1994 [JP] Japan ................................ 6-286206

[51] Int. Cl.$^6$ ........................................... G06F 17/30
[52] U.S. Cl. ..................... 710/241; 710/113; 710/128; 713/300
[58] Field of Search ......................... 395/729, 308, 395/293, 750, 430, 725, 900, 163, 309; 364/483, 482, 200; 382/18

[56] References Cited

U.S. PATENT DOCUMENTS

| | | | |
|---|---|---|---|
| 4,130,864 | 12/1978 | Schlotterer | 364/200 |
| 4,335,448 | 6/1982 | VanNess | 364/900 |
| 4,503,495 | 3/1985 | Boudreau | 364/200 |
| 4,523,331 | 6/1985 | Asija | 382/18 |
| 4,891,634 | 1/1990 | Ina et al. | 340/723 |
| 5,031,115 | 7/1991 | Hayashi | 364/519 |
| 5,157,417 | 10/1992 | Anzai | 346/108 |
| 5,193,196 | 3/1993 | Mochida et al. | 395/725 |
| 5,261,047 | 11/1993 | Rivshin | 395/163 |
| 5,361,329 | 11/1994 | Morita et al. | 395/102 |
| 5,381,549 | 1/1995 | Tamura | 395/700 |
| 5,398,305 | 3/1995 | Yawata et al. | 395/101 |
| 5,420,703 | 5/1995 | Sakai et al. | 358/501 |
| 5,473,749 | 12/1995 | Ito et al. | 395/162 |
| 5,495,602 | 2/1996 | Harada et al. | 395/600 |
| 5,530,882 | 6/1996 | Sasaki et al. | 395/800 |
| 5,535,418 | 7/1996 | Suzuki | 395/845 |
| 5,563,711 | 10/1996 | Sakai et al. | 358/296 |

Primary Examiner—Ayaz R. Sheikh
Assistant Examiner—Eric S. Thlang
Attorney, Agent, or Firm—Fitzpatrick, Cella, Harper & Scinto

[57] ABSTRACT

An information processing apparatus for controlling a plurality of output devices includes a storage unit for storing respective characteristics of the plurality of output devices, a setting unit for setting a plurality of desired characteristics and priority thereamong, and a selection unit for selecting a desired output device from among the plurality of output devices based on the plurality of characteristics and the priority set by the setting unit and the characteristics stored in the storage unit.

36 Claims, 5 Drawing Sheets

| KIND OF PRINTER | RESOLUTION dpi | EVALUATED VALUE OF RESOLUTION | SPEED ppm | EVALUATED VALUE OF SPEED |
|---|---|---|---|---|
| PRINTER A | 600 | 1 | 8 | 0 |
| PRINTER B | 300 | 0 | 12 | 1 |

5,991,846

INFORMATION PROCESSING APPARATUS WITH OUTPUT DEVICE SELECTION BASED ON DEVICE CHARACTERISTICS AND PRIORITIES

BACKGROUND OF THE INVENTION

1. Field of the Invention

This invention relates to an information processing apparatus, and more particularly, to an information processing apparatus which performs recording using one of a plurality of printers.

2. Description of the Related Art

Various kinds of recording methods, such as an ink jet method, a laser beam method, a wire dot method and the like, have been known, and are widely used as means for outputting hard copies in various kinds of information processing systems, such as computer systems, word processors, image processing systems and the like.

Each of the above-described methods has advantages and disadvantages in the quality of recording, the recording speed, the price and the like. Hence, recently, it is not unusual to connect a plurality of printers to a single information processing system, and to select one of the printers in accordance with application. Although printers are often directly connected to the main body of a computer system, a wordprocessor or the like, a method of selecting and using a printer present at a position separated from the main body via a network is widely adopted.

As described above, a plurality of printers of different recording methods are often connected to a single information processing system, and one of the printers can be freely used. However, the user must select an appropriate printer after determining the printer by obtaining information relating thereto.

Accordingly, the user must fully understand characteristics of each printer, i.e., the specifications and performance relating to the quality of recording and the recording speed. When using a printer, the user must appropriately operate a switch for selecting the printer, set a printer driver of an operating system, and precisely set software for selecting the printer connected to the network based on knowledge about the above-described items.

However, it is hard to request the user to have knowledge about the specifications and performance of printers, and operations relating to the selection of a printer. Hence, in an information processing system to which various kinds of printers are connected, a user interface allowing the user to easily select a printer to be used is requested.

SUMMARY OF THE INVENTION

The present invention has been made in consideration of the above-described problems.

It is an object of the present invention to provide a user interface that allows the user to easily select a printer to be used for recording in an information processing system to which various kinds of printers are connected.

According to one aspect, the present invention, which achieves the above-described object, relates to an information processing apparatus for controlling a plurality of output devices, comprising storage means for storing respective characteristics of the plurality of output devices, setting means for setting a plurality of desired characteristics and priority thereamong, and selection means for selecting a desired output device from among the plurality of output devices based on the plurality of characteristics and the priority set by the setting means and the characteristics stored in the storage means.

According to another aspect, the present invention relates to a selection method in an information processing apparatus for controlling a plurality of output devices, comprising the steps of storing respective characteristics of the plurality of output devices in a memory, setting a plurality of desired characteristics and priority there-among, and selecting a desired output device from among the plurality of output devices based on the plurality of characteristics and the priority set in the setting step and the characteristics stored in the memory.

According to still another aspect, the present invention relates to a host computer for controlling a plurality of output devices, comprising a memory device for storing respective characteristics of the plurality of output devices, and a control unit for setting a plurality of desired characteristics and priority thereamong, and for selecting a desired output device from among the plurality of output devices based on the plurality of characteristics and the priority which have been set and the characteristics stored in the memory device.

The foregoing and other objects, advantages and features of the present invention will become more apparent from the following description of the preferred embodiment taken in conjunction with the accompanying drawings.

DESCRIPTION OF THE PREFERRED EMBODIMENT

A preferred embodiment of the present invention will now be described in detail with reference to the drawings.

Figure 1:
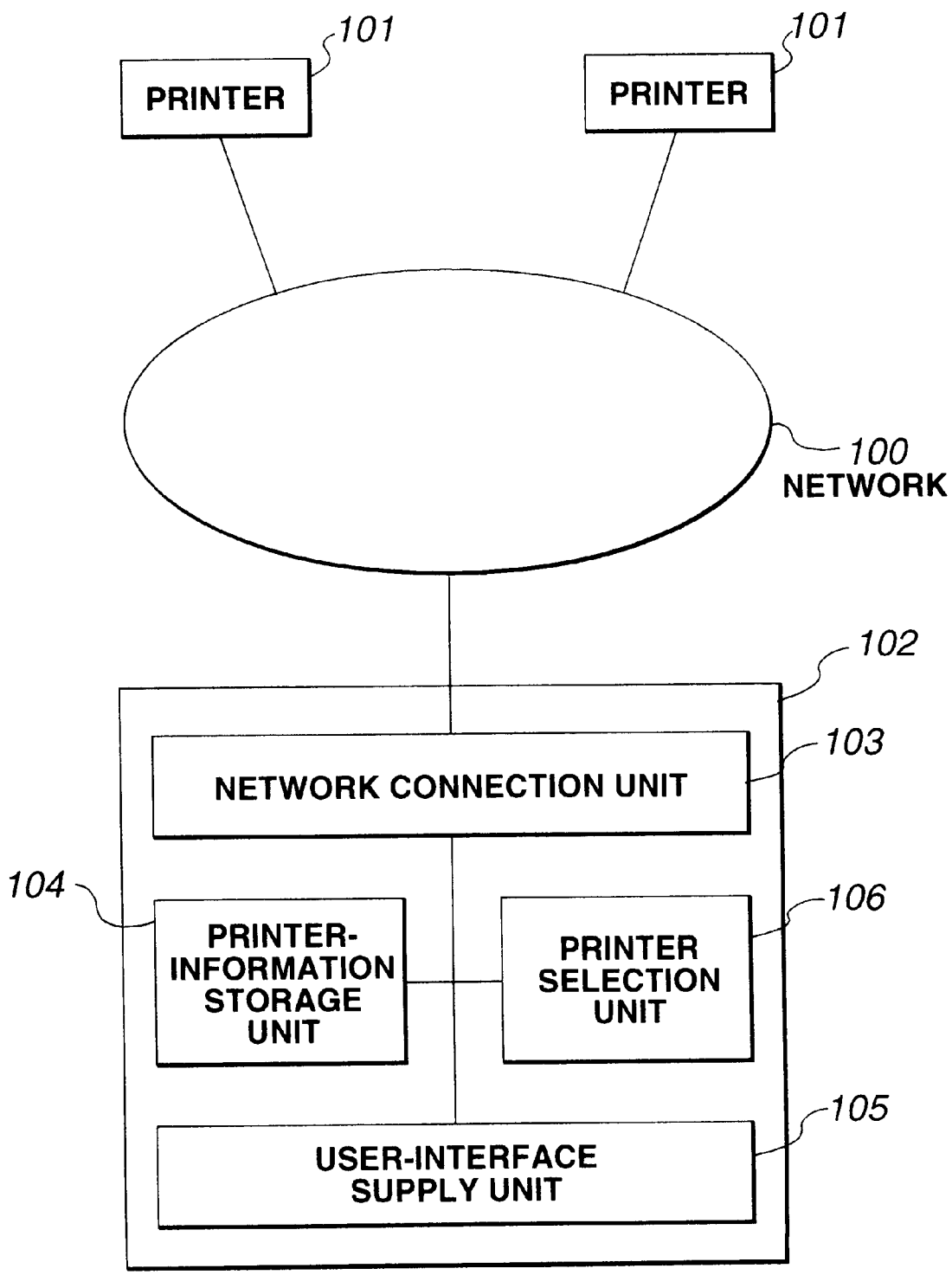
FIG. 1 is a block diagram illustrating the entire configuration of an image processing apparatus according to an embodiment of the present invention.

FIG. 1 is a block diagram illustrating an information processing system according to the embodiment. In FIG. 1, a plurality of printers 101 are connected to a network (such as a LAN (local area network) or the like) 100.

Reference numeral 102 represents a printer selection device, such as a host computer or a printer server connected to the network 100, having the same configuration as the main body of an ordinary computer. The printer selection device 102 is connected to the network 100 via a network connection unit 103, such as a network card or the like, and bidirectionally exchanges data with the respective printers.

The printer selection device 102 includes a printer-information storage unit 104 for storing information relating to the respective printers 101, a user-interface supply unit 105 for supplying the user with information for selecting one of abstracted printers, and a printer selection unit 106 for automatically selecting the most suitable printer based on the information for selecting on of the abstracted printers input from the user-interface supply unit 105, and printer information stored in the printer-information storage unit 104.

The printer-information storage unit 104 comprises a kernel memory of an operating system of the printer selection device 102, and the like. The printer selection unit 106 comprises a printer driver of the operating system, and the like. The user-interface supply unit 105 comprises an ordinary keyboard, a mouse, a CRT (cathode-ray tube) display, and various kinds of drivers of an operating system for controlling these units.

Figure 2:
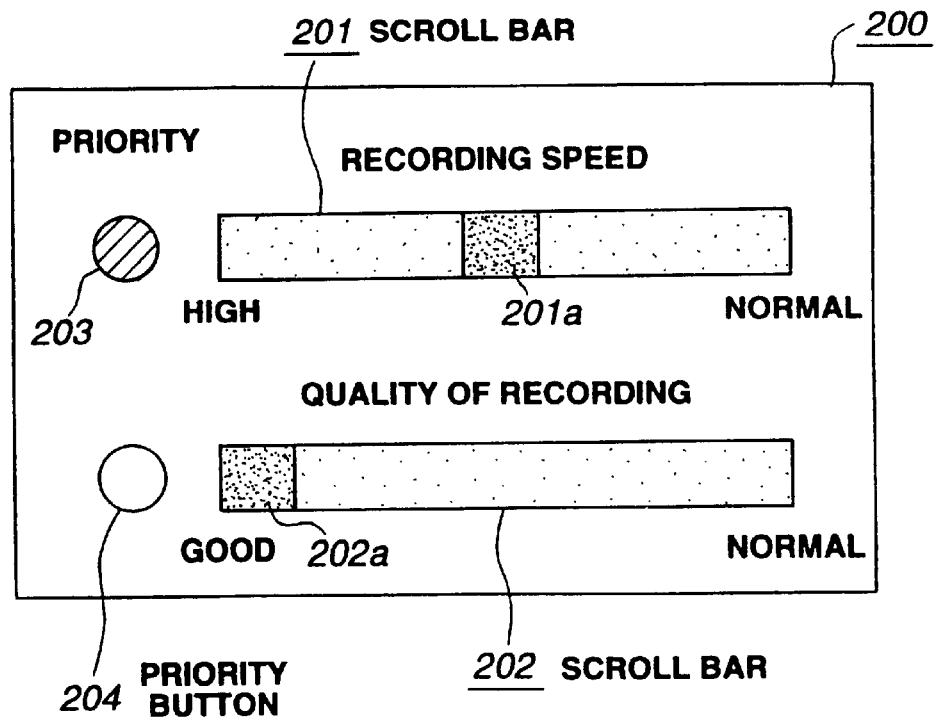
FIG. 2 is a diagram illustrating a user interface for supplying information for selecting one of abstracted printers shown in FIG. 1.

FIG. 2 illustrates an example of supply of information for selecting one of abstracted printers from the user-interface supply unit 105. In FIG. 2, a user interface is configured by scroll bars and buttons which are now widely used in graphical interfaces (for example, the X window system and Microsoft Windows (trade name)) of the computer or the like. In practice, an object 200 shown in FIG. 2 is displayed on a display, such as a CRT or the like, in the form of a dialog box, an overlay window or the like.

As shown in FIG. 2, scroll bars 201 and 202 include scroll boxes 201a and 202b (represented by darker portions) within displays having the shape of a bar graph, respectively, so as to simulate a mechanical sliding potentiometer or the like. The amount of operation can be determined by operating each of the displayed scroll boxes 201a and 202a using a mouse pointer or the like. In the case of FIG. 2, the two scroll bars 201 and 202 for controlling the recording speed and the quality of recording, respectively, are provided. For example, the scroll bar 201 for operating the recording speed can set the recording speed to a desired value between "normal"and "high". On the other hand, the scroll bar 202 for operating the quality of recording can set the quality of recording to a desired value between "normal" and "good".

Figure 3:
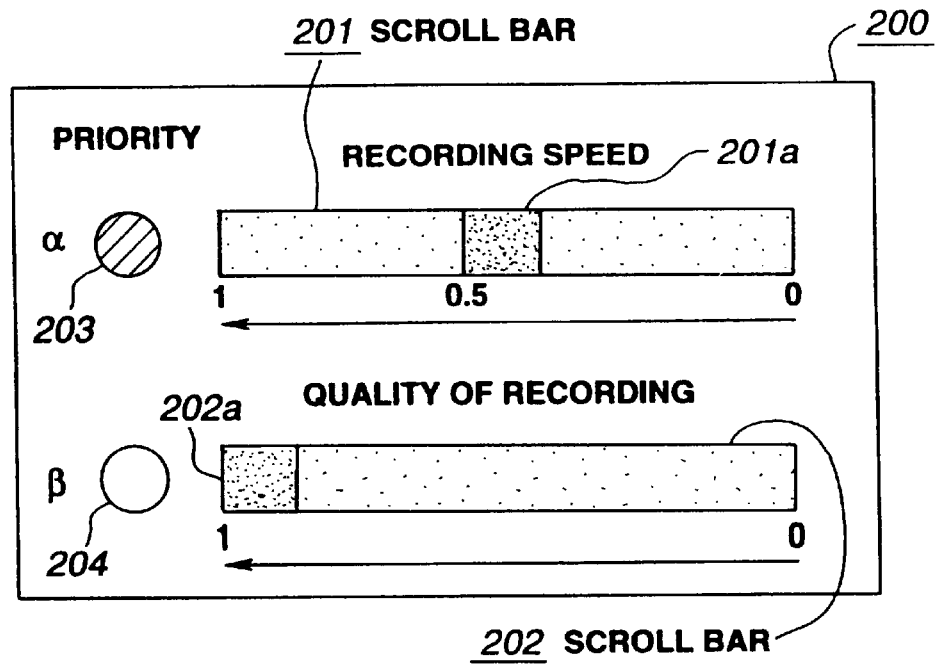
FIG. 3 is a diagram illustrating the configuration of a different user interface and an example of mapping of evaluated values of a user-interface supply unit.

Any other notation than "normal", "high" and "good" may be displayed together with the scroll bars 201 and 202 for the recording speed and the quality of recording. For example, as shown in FIG. 3, numerical values 0–1 may be used for representing positions between "normal", and "high" or "good". These numerical value coincide with mapping of evaluated values of the recording speed and the quality of recording (to be described later).

The user selects a printer by abstractly assigning the desired recording speed and quality of recording using such a user interface, instead of assigning the kind of the printer, the network connection address or the like as in conventional approaches.

That is, the user can abstractly (or ambiguously or in a fuzzy manner) assign the recording speed, the quality of recording and the like without having a knowledge about the kind and the performance of the printer, the network connection address and the like. For example, even a user who does not know the meaning of 300 dpi (dots per inch) or ppm (pages per minute) can automatically select the most suitable printer by abstractly assigning desired values of the recording speed, the quality of recording, and the like.

In FIGS. 2 and 3, each of buttons 203 and 204 provided at side portions of the scroll bars 201 and 202 is a display simulating a circular button switch. In the present embodiment, the buttons 203 and 204 are provided at the left of the scroll bars 201 and 202 for controlling the recording speed and the quality of recording, respectively.

The buttons 203 and 204 assign priority between the two conditions, i.e., the recording speed and the quality of recording, when selecting a printer according to the two conditions. The buttons 203 and 204 are operated in the form of a so-called radio button. The display of the buttons 203 and 204 is controlled such that when one of the buttons is selected by clicking a mouse pointer or the like, the other button becomes in a nonselected state. That is, it is possible to give priority to one of the recording speed and the quality of recording.

In the present embodiment, when information for selecting one of abstract printers is provided by selecting one of the scroll bars 201 and 202 and one of the buttons 203 and 204 of the user-interface supply unit 105, a printer to be used is determined by referring to information relating to the performances of usable printers (hereinafter termed "printer information") stored in a predetermined region of the printer-information storage unit 104 in accordance with the amount of operation of the scroll bar and the button. The processing of the printer selection unit 106 is executed by a CPU (central processing unit, not shown) of the printer selection unit 102. Printer information stored in the printer-information storage unit 104 is output from each printer connected via a bidirectional interface in response to a printer-information request command output to the printer when the printer selection device 102 (the host computer) is turned on, and is subjected to evaluating processing (to be described later).

Figure 4:
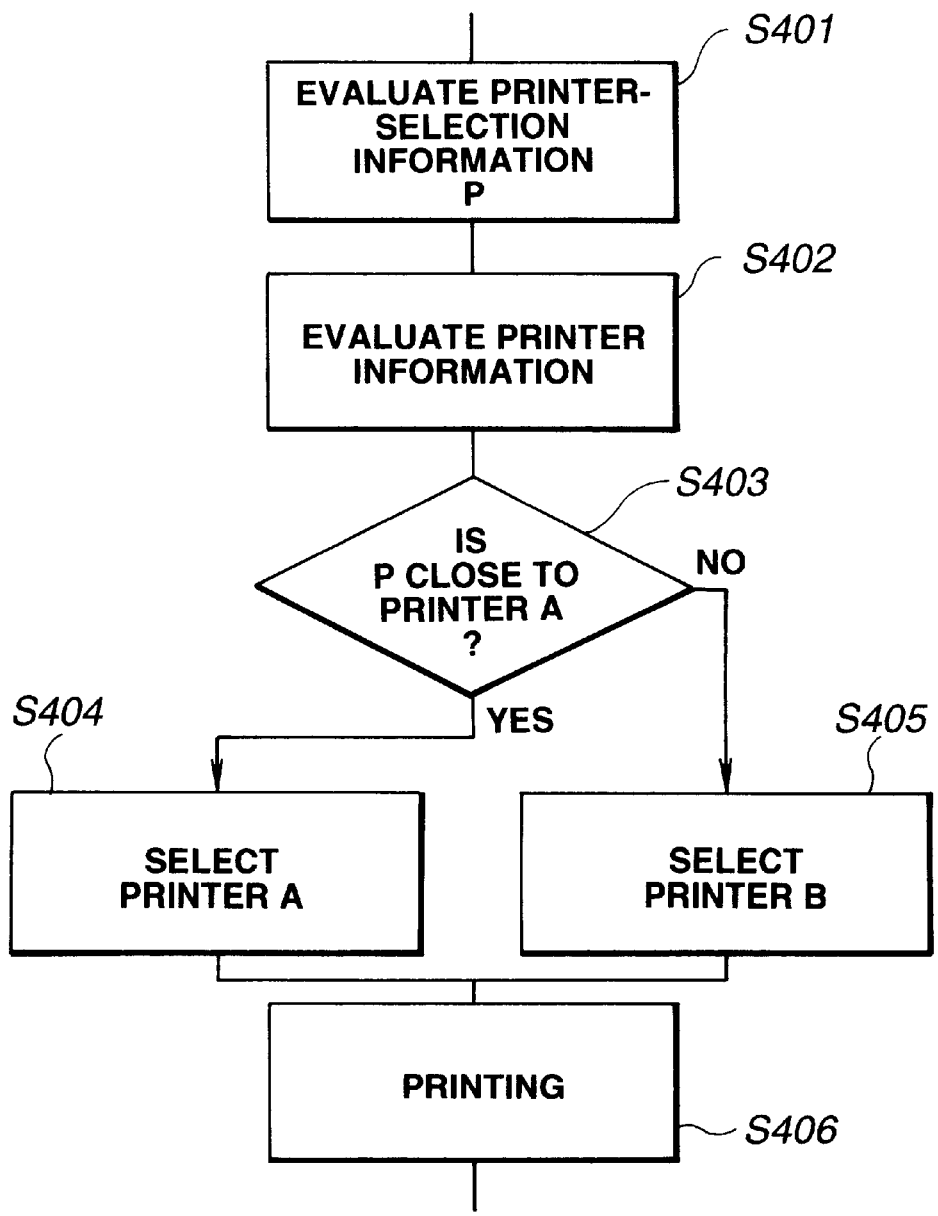
FIG. 4 is a flowchart illustrating control of a printer selection unit.

FIG. 4 illustrates control for printer selection by the printer selection unit 106. In step S401, the printer selection unit 106 reads the positions of scroll boxes in the scroll bars representing the recording speed and the quality of recording of the user-interface supply unit 105 shown in FIG. 2, and performs mapping of the read data as numerical values X and Y.

By multiplying the obtained values of the recording speed and the quality of recording by coefficients $\alpha$ and $\beta$, respectively, in accordance with priority assigned through the button, and adding the obtained values, printer-selection information assigned by the user is evaluated. For example, the numerical value of the printer-selection information assigned by the user is expressed by:

$$P=\alpha X+\beta Y.$$

For example, in the case of FIG. 3, the numerical value of the input recording speed equals 0.5 (for a variable range of 0–1), and the numerical value of the input quality of recording equals 1 (for a variable range of 0–1). In the case of FIG. 3 (or FIG. 2), priority is set through the button such that a value 2 or 1 is selected according to the operation of the button (2 corresponds to higher priority), and $\alpha=2$ and $\beta=1$ for the recording speed. Since the user assigns to give priority to the recording speed, the numerical value of the printer information assigned by the user becomes:

$$P=2\times0.5+1\times1=2.$$

In step S402, printer information is evaluated according to a procedure of mapping parameters of printer information as numerical values from information relating to printers (in the present embodiment, two printers A and B are assumed to be usable) within the printer-information storage unit 104, and evaluating printer-selection information.

Figures 5, 6:
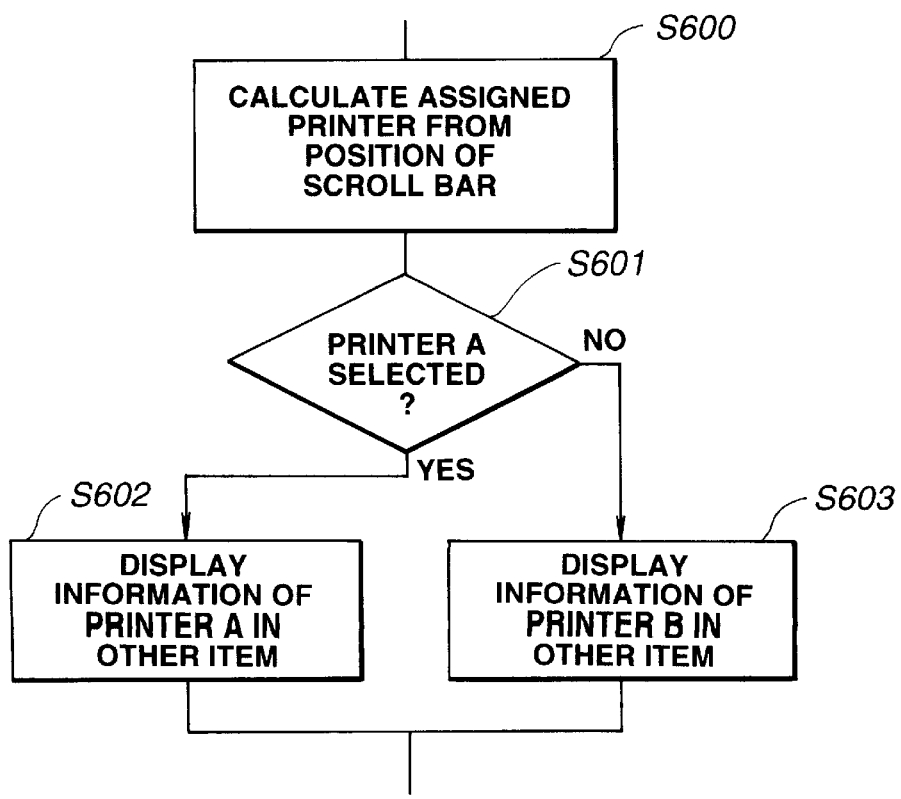
FIG. 5 is a table illustrating an example of printer information within a printer-information storage unit.
FIG. 6 is a flowchart illustrating control of a different printer selection unit.

FIG. 5 illustrates a table of printer information relating to the printers A and B stored in the printer-information storage unit 104. In FIG. 5, information relating to two items, i.e., resolution and the recording speed, is stored so as to correspond to the information of the user-interface supply unit 104 shown in FIGS. 2 and 3.

The table shown in FIG. 5 includes the resolution, the recording speed, and evaluated information obtained by evaluating these items with predetermined units. The printer A has a resolution of 600 dpi (dots per inch), a recording speed of 8 ppm (pages per minute), an evaluated value of resolution of 1, and an evaluated value of speed of 0. The printer B has a resolution of 300 dpi, a recording speed of 12 ppm, an evaluated value of resolution of 0, and an evaluated value of speed of 1. Accordingly, the printer A has a higher resolution, i.e., higher quality of recording, and the printer B has a higher recording speed.

In step S402, evaluation values for the printers A and B are formed using coefficients of priority between the recording speed and the quality of recording assigned by the user. Such evaluation values are obtained by adding values obtained by multiplying the evaluated value of the recording speed and the evaluated value of the resolution shown in FIG. 5 by priority information $\alpha$ of the recording speed and priority information $\beta$ of the quality of recording, respectively. That is, in the case of FIG. 5, the evaluation values are:

2×0+1×1=1 for the printer A, and

2×1+1×0=2 for the printer B.

In step S403, the numerical value P of the printer information assigned by the user is compared with the numerical value of printer information of a printer having a smaller evaluation value, and the printer A or the printer B is selected in step S404 or step S405, respectively.

In the case of FIGS. 3 and 5, the numerical value P of the printer information assigned by the user equals 2, and the evaluation values of printer information obtained in step S402 equal 1 and 2 for the printer A and the printer B, respectively. Hence, the printer B is selected.

In step S406, a printer is selected based on the above-described selection according to a predetermined network protocol using the network connection unit 103, and information to be recorded is output to the selected printer.

Although in the foregoing description, the case of two selectable printers has been illustrated, selection of a printer can be performed according to the same control even if a larger number of printers are selectable.

Although in FIG. 5, two printers are registered, "logical" printers may be registered. For example, the above-described technique may be applied to mode selection in a single printer having a plurality of modes. That is, a mode A and a mode B of the printer are registered as a printer A and a printer B, respectively, and one of the modes is selected in printer selection. Of course, both physical printers and logical printers may be stored in the printer-information storage unit 104. In such a case, it is, of course, necessary to provide a system capable of appropriately executing selection of a physical printer and selection of a logical printer independently (for example, simultaneously storing flags, or appropriately generating information for performing one of mode selection and printer selection on the network).

Although in the foregoing description, the recording speed and the quality of recording are used as items of characteristics for selecting a printer, any other items, such as gradient, discrimination of color/monochrome, the kind of fonts, cost or the like, may be added. A scroll bar and a priority button as shown in FIGS. 2 and 3 may be provided for each of the added items. Although in FIG. 5, the range of evaluated values is simplified as 1–0, any different and more complicated evaluation system may, of course, be used.

The information relating to characteristics of printers stored in the printer-information storage unit 104 shown in FIG. 5 may be distributed in the form of a vendor of an operating system, part of printer-driver software provided by a maker of printers, or the like. Alternatively, information relating to characteristics of each printer 101 may be stored in a ROM or the like of the printer, the printer selection device 102 (or the computer or the like constituting it) may perform communication via the network connection unit 103 (or a printer interface or the like in the case of a stand-alone computer) at a predetermined timing (for example, during booting of the selection device 102), to collect information relating to characteristics of each printer 101 from the printer. In such a case, if only concrete numerical values of the resolution and the speed are transmitted from the printer, evaluated numerical values as shown in FIG. 5 may be formed based on an appropriate evaluation system.

By using a printer after collecting information relating to characteristics of the printer in the above-described manner, a change in the system can be more flexibly dealt with.

The above-described user interface for selecting a printer is only an example. Any other structure may be used provided that it is effective for inputting standards for selecting a printer, or for performing feedback of an input amount to the user. For example, although in the above-described example, priority between the recording speed and the quality of recording is set using buttons, the priority may be input using a scroll bar or the like.

Figure 7:
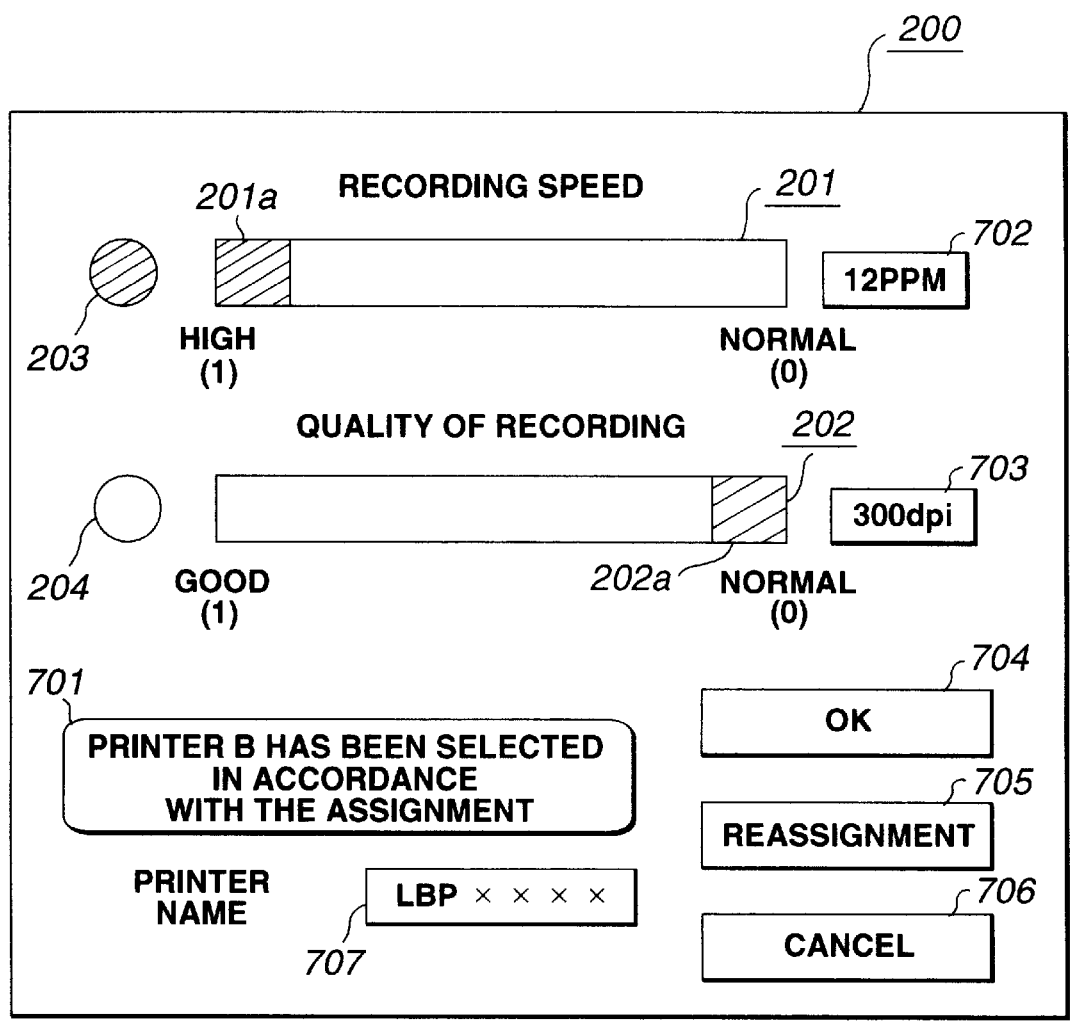
FIG. 7 is a diagram illustrating a user interface used together with the processing shown in FIG. 6.

FIGS. 6 and 7 illustrates another example of selection of a printer. The configuration of the entire system is the same as that shown in FIG. 1. In the flowchart shown in FIG. 6 illustrating control performed by the printer selection unit 106, only portions which differ from the flowchart shown in FIG. 4 are illustrated. In FIG. 6, step S600 illustrates the processing of steps S401–S406, i.e., processing of selecting a printer from the positions of scroll boxes in the scroll bars input by the user in FIGS. 2 or 3.

In the processing shown in FIG. 6, after selecting a printer in the same manner as in the case of FIG. 4, the result of the selection is also displayed. If it is assumed that one of the printer A and the printer B is selected as in the case of FIG. 4, it is determined in step S601 whether or not the printer A has been selected. When the printer A has been selected, the process proceeds to step S602, When the printer B has been selected instead of the printer A, the process proceeds to step S603.

That is, in accordance with the selection of the printer, information relating to the printer A is displayed in step S602, and information relating to the printer B is displayed in step S603, so that the user can recognize the result of the selection.

Such display of printer information may be performed using the table shown in FIG. 5. For example, a window for displaying numerical values of the resolutions (or their evaluated values), the recording speeds (or their evaluated values) and the like of the printer A and the printer B stored in the printer-information storage unit 104 may be popped up on a CRT.

However, the display method which is most suitable for the user interface for selecting a printer shown in FIG. 2 or 3 will be as shown in FIG. 7.

That is, when selecting a printer using the object shown in FIG. 2, the object 200 is changed as shown in FIG. 7 after the selection (or the display having the form of FIG. 7 may be used from the beginning). FIG. 7 illustrates various objects indicated by reference numerals starting from 701 within the object 200.

Reference numeral 701 represents display of a message "Printer B has been selected in accordance with the assignment" to indicate the selected printer. In this case, as represented by reference numeral 707, the printer name (or the location where the printer is installed) may be displayed in the vicinity of the display 701 (when performing such display, printer names, locations where printers are to be installed, and the like are stored in the selection information shown in FIG. 5). Alternatively, the arrangement of the printer selection device 102 (the host computer) and the respective printers may be displayed, and the user may be notified in detail of the location where the selected printer is installed by flashing the selected printer.

An important point in FIG. 7 is that the positions of the scroll boxes 201a and 202a move in accordance with the selection of the printer.

That is, if it is assumed that the scroll boxes 201a and 202a have been operated as shown in FIG. 2 and the printer B has been selected in the above-described manner, in FIG. 7, the positions of the scroll boxes 201a and 202a are moved to positions corresponding to evaluated values of the printer B in a state in which both ends of the scroll bars 201 and 202 correspond to the range 1–0 of the evaluated values shown in FIG. 5. Accordingly, compared with the case of FIG. 2, the scroll box 201a moves to the left end and the scroll box 202a moves to the right end in FIG. 7. In FIG. 7, the values (702 and 703) of the recording speed and the resolution of the selected printer B are displayed at the right of the scroll bars 201 and 202, respectively.

By abstractly selecting a printer utilizing a graphical interface similar to that used in printer selection by controlling scroll bars in the above-described manner, the user can intuitively understand the result of the selection. In addition, by also displaying concrete contents as represented, for example, by reference numerals 701, 702, 703 and 707, information sufficient for a user having a certain amount of knowledge can be subjected to feedback.

In FIG. 7, reference numerals 704, 705 and 706 represent buttons which can be operated by a mouse pointer or the like, and which indicate "OK", "reassignment" and "cancel", respectively. That is, the "OK" button 704 is used for inputting acceptance of the displayed selection of the printer by the user, the "reassigment" button 705 is used for instructing return to the state shown in FIG. 2 (or FIG. 3) and to again perform selection, and the "cancel" button 706 is used for interrupting the printer selection processing.

By providing these buttons 704–706, it is possible to confirm the contents of the selection of the printer, to enable to again perform selection if there is any problem, to refuse the contents of the selection, and to allow the user to interrupt the processing. When displaying these buttons, it is, of course, necessary to hold printing processing of step S406 shown in FIG. 4 in the state of display shown in FIG. 7.

Although FIG. 7 illustrates a case of performing various displays within the object 200, the user can, of course, select or abandon some of these displays whenever necessary, and perform various modifications.

For example, although in FIG. 7, both ends of the scroll bars correspond to the range of evaluated values shown in FIG. 5, the both ends may correspond to the maximum value and the minimum value of the recording speed or the quality of recording. For example, both ends of the scroll bars 201 and 202 may correspond to 0–600 dpi and 0–12 ppm, the values indicated at the right may be changed to the maximum values, and the positions of the scroll boxes 201a and 202a may be moved to selected values of the recording speed and the quality of recording of the printer. According to this approach, information relating to the recording speed and the quality of recording of the printer which have been selected can be subjected to feedback to the user without displaying the selected values as represented by reference numerals 702 and 703.

The individual components designated by blocks in the drawings are all well known in the information processing apparatus arts and their specific construction and operation are not critical to the operation or the best mode for carrying out the invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information processing apparatus, functioning as a host unit for controlling a plurality of printing devices, said apparatus comprising:

storage means for storing respective values corresponding to performance characteristics of the plurality of printing devices;

setting means for setting at least one desired non-precise value relating to a respective performance characteristic, on the basis of an instruction input through a user-interface display unit displaying elements corresponding to the performance characteristics; and selection means for selecting a desired printing device from among the plurality of printing devices on the basis of the non-precise value set by said setting means and at least one of the values corresponding to the performance characteristics stored in said storage means.

2. An information processing apparatus according to claim 1, wherein the performance characteristics comprise an output speed of each of the printing devices.

3. An information processing apparatus according to claim 1, wherein the performance characteristics comprise an output resolution of each of the printing devices.

4. An information processing apparatus according to claim 1, wherein the values stored in said storage means are obtained from corresponding ones of the plurality of printing devices.

5. An information processing apparatus according to claim 1, wherein said setting means sets the at least one desired non-precise value in response to a user inputting the instruction through the user-interface display unit by manipulating the elements displayed on the user-interface display unit.

6. An information processing apparatus according to claim 1, wherein said setting means sets a plurality of desired non-precise values relating to the performance characteristics and a priority of the performance characteristics, and wherein said selection means selects the desired printing device from among the plurality of printing devices by comparing assignment information based on the plurality of desired non-precise values and the priority set by said setting means with control information based on the values stored in said storage means and the priority.

7. An information processing apparatus according to claim 6, wherein the performance characteristics comprise at least an output speed and an output resolution of said printing devices.

8. An information processing apparatus according to claim 6, wherein said setting means sets the priority among the performance characteristics in response to a selection of a displayed priority element corresponding to a respective performance characteristic.

9. An information processing apparatus according to claim 1, wherein said information processing apparatus is connected to the plurality of printing devices via a network.

10. An information processing apparatus according to claim 1, further comprising recognizing means for recognizing the at least one non-precise value as precise characteristic information.

11. An information processing apparatus according to claim 1, further comprising informing means for informing a selected printing device to a user.

12. An information processing apparatus according to claim 11, wherein said informing means informs a user of a location of the selected printing device by displaying an arrangement of the plurality of printing devices on said user-interface display unit.

13. An information processing apparatus according to claim 1, wherein said setting means sets the at least one desired non-precise value in response to a manipulation of a displayed scroll bar corresponding to the performance characteristics.

14. An information processing apparatus according to claim 13, wherein said setting means displays on said user-interface display unit a value of a performance characteristic corresponding to the non-precise value set in response to the manipulation of said displayed scroll bar.

15. An information processing apparatus according to claim 1, further comprising output means for outputting data to be printed to the printing device selected by said selecting means.

16. A selection method in an information processing apparatus functioning as a host for controlling a plurality of printing devices, said method comprising the steps of:

storing respective values corresponding to performance characteristics of the plurality of printing devices in a memory;

setting at least one desired non-precise value relating to a performance characteristic, on the basis of an instruction input through a user-interface display unit displaying elements corresponding to the performance characteristics; and selecting a desired printing device from among the plurality of printing devices on the basis of the non-precise value set in said setting step and at least one of the values corresponding to the performance characteristics stored in the memory.

17. A method according to claim 16, wherein the performance characteristics comprise an output speed of each of the printing devices.

18. A method according to claim 16, wherein the performance characteristics comprise an output resolution of each of the printing devices.

19. A method according to claim 16, wherein the values stored in said memory are obtained from corresponding ones of the plurality of the printing devices.

20. A method according to claim 16, wherein the setting step sets the at least one desired non-precise value in response to a user inputting the instruction through the user-interface display unit by manipulating the elements displayed on the user-interface display unit.

21. A method according to claim 16, wherein said setting step sets a plurality of desired non-precise values relating to the performance characteristics and a priority of the performance characteristics, and wherein the desired printing device is selected from among the plurality of printing devices by comparing assignment information based on the plurality of desired non-precise values and the priority set in said setting step with control information based on the plurality of values stored in said storage step and the priority.

22. A method according to claim 21, wherein the performance characteristics comprise at least an output speed and an output resolution of said printing devices.

23. A method according to claim 21, wherein said setting step sets the priority among the performance characteristics in response to a selection of a displayed priority element corresponding to a respective performance characteristic.

24. A method according to claim 16, wherein the information processing apparatus is connected to the plurality of printing devices via a network.

25. A selection method in an information processing apparatus according to claim 16, further comprising a step of recognizing the at least one non-precise value as precise characteristic information.

26. A selection method in an information processing apparatus according to claim 16, further comprising a step of informing a selected printing device to a user.

27. A method according to claim 26, wherein said informing step informs a user of a location of the selected printing device by displaying an arrangement of the plurality of printing devices on the user-interface display unit.

28. A method according to claim 16, wherein said setting step sets the at least one desired non-precise value in response to a manipulation of a displayed scroll bar corresponding to the performance characteristics.

29. A method according to claim 28, wherein said setting step displays on said user-interface display unit a value of a performance characteristic corresponding to the non-precise value set in response to the manipulation of said displayed scroll bar.

30. A method according to claim 16, further comprising a step of outputting data to be printed to the printing device selected by said selecting step.

31. A host computer for controlling a plurality of printing devices, said computer comprising:

a memory device for storing respective values corresponding to performance characteristics of the plurality of printing devices; and a control unit for setting at least one desired non-precise value relating to a performance characteristic, on the basis of an instruction input through a user-interface display unit displaying elements corresponding to the performance characteristics, and for selecting a desired printing device from among the plurality of printing devices on the basis of the non-precise value which has been set and at least one of the values corresponding to the performance characteristics stored in said memory device.

32. A host computer according to claim 31, further comprising recognizing means for recognizing the at least one non-precise value as precise characteristic information.

33. A host computer according to claim 31, further comprising informing means for informing a selected printing device to a user.

34. A computer usable medium having stored computer readable instruction codes for an information processing apparatus functioning as a host for controlling a plurality of printing devices comprising:

- a first set of computer readable instruction codes for storing respective values corresponding to performance characteristics of the plurality of printing devices in a memory;
- a second set of computer readable instruction codes for setting at least one desired non-precise value relating to a performance characteristic, on the basis of an instruction input through a user-interface display unit displaying elements corresponding to the performance characteristics; and
- a third set of computer readable instruction codes for selecting a desired printing device from among the plurality of printing devices on the basis of the non-precise value set by said second set of computer readable instruction codes and at least one of the values corresponding to the performance characteristics stored in the memory.

35. A computer usable medium having stored computer readable instruction codes according to claim 34, further comprising a fourth set of computer readable instruction codes for recognizing the at least one non-precise value as precise characteristic information.

36. A computer usable medium having stored computer readable instruction codes according to claim 34, further comprising a fourth set of computer readable instruction codes for informing a selected printing device to a user.

* * * * *